United States Patent [19]

Shimaguchi et al.

[11] Patent Number: 5,017,102

[45] Date of Patent: May 21, 1991

[54] MAGNETICALLY COUPLED PUMP AND NUCLEAR REACTOR INCORPORATING SAID PUMP

[75] Inventors: Takashi Shimaguchi; Toshihiro Yamada, both of Ibaraki; Tatsuo Natori, Kashiwa; Akihisa Okada; Hiroshi Misumi, both of Tsuchiura, all of Japan

[73] Assignee: Hitachi, Ltd., Tokyo, Japan

[21] Appl. No.: 441,962

[22] Filed: Nov. 28, 1989

[30] Foreign Application Priority Data

Nov. 30, 1988 [JP] Japan .................... 63-300507

[51] Int. Cl.$^5$ ............................................. F04B 17/00
[52] U.S. Cl. ..................................... 417/420; 376/402; 376/404; 376/405; 417/423.14
[58] Field of Search ..................... 376/402, 404, 405; 417/368, 420, 366, 423.14; 310/104

[56] References Cited

U.S. PATENT DOCUMENTS

| | | | |
|---|---|---|---|
| 4,115,040 | 9/1978 | Knorr | 417/420 |
| 4,120,618 | 10/1978 | Klaus | 417/420 |
| 4,754,181 | 6/1988 | Mizobuchi et al. | 310/104 |
| 4,812,108 | 3/1989 | Kotera | 417/368 |
| 4,837,472 | 6/1989 | Kotera | 310/156 |
| 4,850,818 | 7/1989 | Kotera | 417/366 |

OTHER PUBLICATIONS

"Piping Techbology", pp. 55-57, Jan. 5, 1987.
Denpa Shinbun, p. 24, Sep. 10, 1987.

Primary Examiner—Brooks H. Hunt
Assistant Examiner—N. Bhat
Attorney, Agent, or Firm—Antonelli, Terry, Stout & Kraus

[57] ABSTRACT

A magnet pump has a magnet coupling for magnetically coupling an inner ring yoke and an outer ring yoke so as to magnetically transmit a torque from driving part to driven part of the pump to rotate the driven part. The magnet pump comprises magnetized magnet pieces bonded to the outer peripheral surface of the inner ring yoke and magnetized magnet pieces bonded to the inner peripheral surface of the outer ring yoke; non-magnetic cylindrical covers covering the surface of the inner ring yoke carrying the magnet pieces and the surface of the outer ring yoke carrying the magnet pieces, respectively; and mold resin parts filling the gap between the surface of the inner ring yoke and the associated non-magnetic cylindrical cover and the gap between the surface of the outer yoke ring and the associated non-magnetic cylindrical cover. Also disclosed are a method of producing the magnet pump in which the non-magnetic cylindrical covers are used as molds, and a nuclear reactor equipment in which the magnet pump is used as a coolant circulation pump.

8 Claims, 3 Drawing Sheets

MAGNETICALLY COUPLED PUMP AND NUCLEAR REACTOR INCORPORATING SAID PUMP

BACKGROUND OF THE INVENTION

1. Field of the Invention

The present invention relates to a magnet pump, a method of producing the magnet pump and a nuclear reactor equipment which incorporates the magnet pump.

2. Description of the Related Art

In general, a magnet pump does not have any shaft seal portion so that it can suitably be used for the purpose of transfer of chemical waste liquids, slurries and so forth.

FIG. 6 illustrates the basic construction of a known magnet pump.

This magnet pump has a magnetic coupling to which the torque of a motor is transmitted through a drive shaft 1. The magnet coupling has an outer ring 2 having a magnet 4 and an inner ring 3 having a magnet 5. The torque of the drive shaft 1 causes the outer ring 2 to rotate, which in turn causes the inner ring 3 to rotate as a result of attractive and repulsive forces acting between the magnets 4 and 5, so that a driven shaft 10 connected to the inner ring 3 is rotated. The driven shaft 10 in turn drives an impeller 11 connected thereto, so that a liquid is sucked through a suction port 13 and is discharged from the discharge port 14. A can 12 serves to isolate the motor part including the outer ring 2 and the liquid-contact part including the inner ring 3 from each other.

Thus, the magnet pump is devoid of any shaft seal portion so that it can suitably be used in handling a chemical liquid which requires specific leak prevention measure, as well as slurries which inevitably cause grinding or wear of sliding parts.

The magnet pump also can suitably be used as a coolant circulation pump of a nuclear reactor. In particular, the use of a magnet pump in the primary cooling system eliminates any risk of external leak of coolant which radiates radioactive rays such as a $\gamma$ ray. In addition, the time required for a periodical inspection can remarkably be shortened because only the liquid-contact part of the pump needs inspection, so that the time of exposure of the inspectors to a radioactive atmosphere is shortened, thus enhancing safety.

This type of magnet pump is disclosed, for example, in "Piping Technology", pp 55–57, Jan. 5, 1987.

Unfortunately, however, the known magnet pump has not been considered for transmission of a large torque, which is a fundamental requirement for pumps. Thus, it has been quite difficult to realize a large-scale magnet pump capable of operating at a torque level of 15 kg·m or greater required in nuclear reactor coolant circulation pump and other pumps.

A greater scale of the magnet pump essentially requires a greater torque capacity of the magnet coupling, i.e., to increase the magnetic power of the magnet.

Conventionally, ferrite or a rare earth magnet, in particular samarium cobalt (referred to as "SmCo", hereinafter) magnet, has been used as the magnets of the magnet couplings of magnet pumps. SmCo has a large value of the maximum energy product (BH)max which is specifically useful for large-scale magnet couplings.

However, there still exists the following problem which has to be overcome.

Small-capacity magnet couplings are produced by the following processes: namely, a non-magnetized magnet is fixed to the inside of, for example, an inner ring yoke. This assembly is then placed in a mold which is then charged with a resin of at 150° to 250° C. Then, the magnet is magnetized by means of a magnetizing yoke. The following problems are encountered when this known process is applied to the production of a large-scale magnet coupling.

(1) Quite a large-size magnetizing equipment is necessary.

(2) It is difficult to separate the magnet from the magnetizing yoke after the magnetization.

For these reasons, there has been a practical limit in the size of the magnet coupling.

In another process, a magnetized magnet is bonded to an inner or outer ring yoke and then resin-molding is conducted within a mold. In this process, a problem is encountered in that the separation of the resin-molded magnet from the mold is difficult due to magnetic attraction between the magnet and the mold metal.

A greater capacity of magnet coupling essentially requires greater maximum energy product $(BH)_{max}$ of the magnet. Such large maximum energy product is obtained with a neodymium-iron type magnet, as well as with an SmCo magnet mentioned before. Properties of samarium-type magnet and neodymium-type magnet are shown in the following Table 1.

TABLE 1

Properties of samarium-type magnet and neodymium-type magnet
(Extracted from Denpa Shinbun, page 24, Sept. 10, 1987)

|  | Sm magnet | Nd magnet |
|---|---|---|
| Elements | Sm, Co, Fe, Cu and other additives | Nd, Fe, B and other additives |
| Magnetic characteristic $(BH)_{max}$ | 16~32 MGOe | 27~37 MGOe |
| Br | 8.2~11.6 KG | 10.2~12.6 KG |
| iHc | 6.2~20.0 kOe | 11.0~20.0 kOe |
| Reversible magnetic permeability | 1.05 | 1.05 |
| Reversible temperature change Br | −0.03~−0.04%/c | −0.12~−0.13%/c |
| Curie point | 800° C. | 320° C. |
| Cracking tendency | fragile and easy to crack | hard and not easy to crack |
| Surface rusting | Comparatively small rusting tendency | Comparatively large rusting tendency |

In general, the coolant circulation system of a nuclear reaction incorporates a plurality of circulation pumps, some of which are installed close to the nuclear reactor. Such circulation pumps are required to transport coolant which has high neutron beam density. Neutron beams makes elements such as Co radioactive, posing problems in regard to degradation of properties of the magnet and safety during inspection.

This gives a rise to the demand for a magnet which does not contain any radioactive element, and such a requirement is met by a neodymium-iron type magnet.

Unfortunately, however, this magnet exhibits an inferior corrosion resistance, so that a surface coating is essentially required. Furthermore a new sealing method has to be developed because the characteristic of the magnet tends to be degraded as a result of a temperature rise.

Thus, in order to obtain a large-capacity magnet coupling which is essential for producing a large-size magnet pump, in particular a coolant circulation pump of a nuclear reactor, it is necessary that a method is developed which enables an easy resin-molding of magnets of a magnet coupling without impairing the characteristics of the magnets.

SUMMARY OF THE INVENTION

Accordingly, a first object of the present invention is to provide a magnet pump which is easy to be designed to have a large capacity.

A second object of the present invention is to provide a magnet pump which can effectively be used in a coolant circulation system of a nuclear reactor.

A third object of the present invention is to provide a method of producing a magnet pump of the type described herein without fail.

A fourth object of the present invention is to provide a method of producing a magnet pump which has a large resistance to corrosion.

A fifth object of the present invention is to provide a nuclear reactor equipment incorporating a magnet pump as a circulation pump of a coolant having $\gamma$ rays, the magnet pump being free of demagnetization by radioactive rays and, hence, being able to stably stand long use and, at the same time, capable of insuring safety of inspectors during periodical inspection.

A sixth object of the present invention is to provide a nuclear reactor equipment incorporating a magnet pump as a circulation pump of a coolant having neutron beams, the magnet pump being free of demagnetization by radioactive rays and, hence, being able to stably stand long use and, at the same time, capable of insuring safety of inspectors during periodical inspection.

To achieve the first object, the present invention in its one aspect provides a magnet pump having a magnet coupling for magnetically coupling an inner ring yoke and an outer ring yoke so as to magnetically transmit a torque from a driving part to a driven part of the pump to rotate the driven part, the magnet pump comprising: magnetized magnet pieces bonded to the outer peripheral surface of the inner ring yoke and magnetized magnet pieces bonded to the inner peripheral surface of the outer ring yoke. Non-magnetic cylindrical covers cover the surface of the inner ring yoke carrying the magnet pieces and the surface of the outer ring yoke carrying the magnet pieces, respectively, and molded resin parts fill the gap between the surface of the inner ring yoke and the associated non-magnetic cylindrical cover and the gap between the surface of the outer yoke ring and the associated non-magnetic cylindrical cover.

The first object also is achieved by a magnet pump having a magnet coupling for magnetically coupling an inner ring yoke and an outer ring yoke so as to magnetically transmit a torque from a driving part to a driven part of the pump to rotate the driven part, the magnet pump comprising: magnetized magnet pieces attached to the outer peripheral surface of the inner ring yoke and magnetized magnet pieces attached to the inner peripheral surface of the outer ring yoke. Non-magnetic cylindrical covers cover the surface of the inner ring yoke carrying the magnet pieces and the surface of the outer ring yoke carrying the magnet pieces, respectively, and resin sleeves are fitted and fixed in the gap between the surface of the inner ring yoke and the associated non-magnetic cylindrical cover and the gap between the surface of the outer yoke ring and the associated non-magnetic cylindrical cover.

To achieve the second object, the present invention provides a magnet pump wherein at least the magnetized magnets on the inner ring yoke of the magnet coupling is made of a material composed of non-radioactive elements.

The third object is achieved by a method of producing a magnet pump comprising the steps of: bonding magnetized magnet pieces to the outer peripheral surface of the inner ring yoke and to the inner peripheral surface of the outer ring yoke; covering the surface of the inner ring yoke carrying the magnet pieces and the surface of the outer ring yoke carrying the magnet pieces with non-magnetic cylindrical covers, respectively; and charging a self-curing castable resin into the gap between the surface of the inner ring yoke and the associated non-magnetic cylindrical cover and the gap between the surface of the outer yoke ring and the associated non-magnetic cylindrical cover; and allowing the resin to cure.

The third object is well achieved when the magnetized magnet pieces are made of a material which contains, as major constituents, neodymium, iron and boron, while the self-curing resin exhibits a temperature rise to a level not higher than 90° C.

The fourth object is achieved by a method wherein the self-curing resin is charged into the gaps after the gaps are evacuated to a negative pressure, and also by a method wherein the self-curing resin is charged into the gaps after the gaps are charged with an inert gas.

These methods effectively prevent oxidation corrosion of the magnets due to oxygen staying in the gaps between the surfaces carrying the magnet pieces and the non-magnetic cylindrical covers.

· The fifth object is achieved by using a magnet pump wherein at least the magnetized magnets on said inner ring yoke of the magnet coupling is made of a material composed of non-radioactive elements, preferably a material which contains, as major constituents, neodymium, iron and boron.

The sixth object also is achieved by using a magnet pump wherein at least the magnetized magnets on said inner ring yoke of the magnet coupling is made of a material composed of non-radioactive elements, preferably a material which contains, as major constituents, neodymium, iron and boron.

In the magnet pump of the present invention, at least the magnetized magnet pieces on the inner ring yoke are made of a material composed of non-radioactive elements. These magnetized magnet pieces are resistant to demagnetization caused by radioactive rays, so that the magnet pump can stably maintain its performance to stand a long use. When this pump is used in the coolant circulation system of a nuclear reactor, the amount of exposure of inspectors during periodical inspection is reduced to enhance the safety.

When the magnetized magnet pieces are made of a material which contains, as major constituent, neodymium, iron and boron, the performance of the magnet pump is further improved, particularly when used in the coolant circulation system of a nuclear reactor.

According to the method of the present invention, the magnet pump can be produced without fail by bonding magnetized magnet pieces to the outer peripheral surface of the inner ring yoke and to the inner peripheral surface of the outer ring yoke; covering the surface of the inner ring yoke carrying the magnet pieces and the surface of the outer ring yoke carrying the magnet pieces with non-magnetic cylindrical covers, respectively; and charging a self-curing castable resin into the gap between the surface of the inner ring yoke and the associated non-magnetic cylindrical cover and the gap between the surface of the outer yoke ring and the associated non-magnetic cylindrical cover; and allowing the resin to cure.

Magnet pumps can be produced without fail by a method wherein the magnetized magnet pieces are made of a material which contains, as major constituents, neodymium, iron and boron, and wherein the self-curing resin exhibits a temperature rise to a level not higher than 90° C.

When the charging of the self-curing resin into the gaps between the surfaces of the inner and outer ring yokes carrying the magnet pieces and the associated non-magnetic cylindrical covers is conducted after evacuating these gaps to a vacuum or filling the gaps with an inert gas, it is possible to prevent oxidation corrosion of the magnet pieces which may otherwise be caused by oxygen stagnant in these gaps, thus making it possible to obtain a magnet pump having a magnet coupling with superior corrosion resistance.

The nuclear reactor equipment of the present invention incorporates the magnetic pump as a coolant circulation pump for circulating a coolant having γ-ray or neutron beams in a coolant circulation system of a nuclear reactor. The magnet pump can stably exhibit its performance for a long time without suffering from demagnetization by radioactive rays, while insuring safety of inspectors during periodical inspection of the equipment.

DESCRIPTION OF THE PREFERRED EMBODIMENTS

Embodiments of the present invention will be described with reference to the accompanying drawings.

Figure 1:
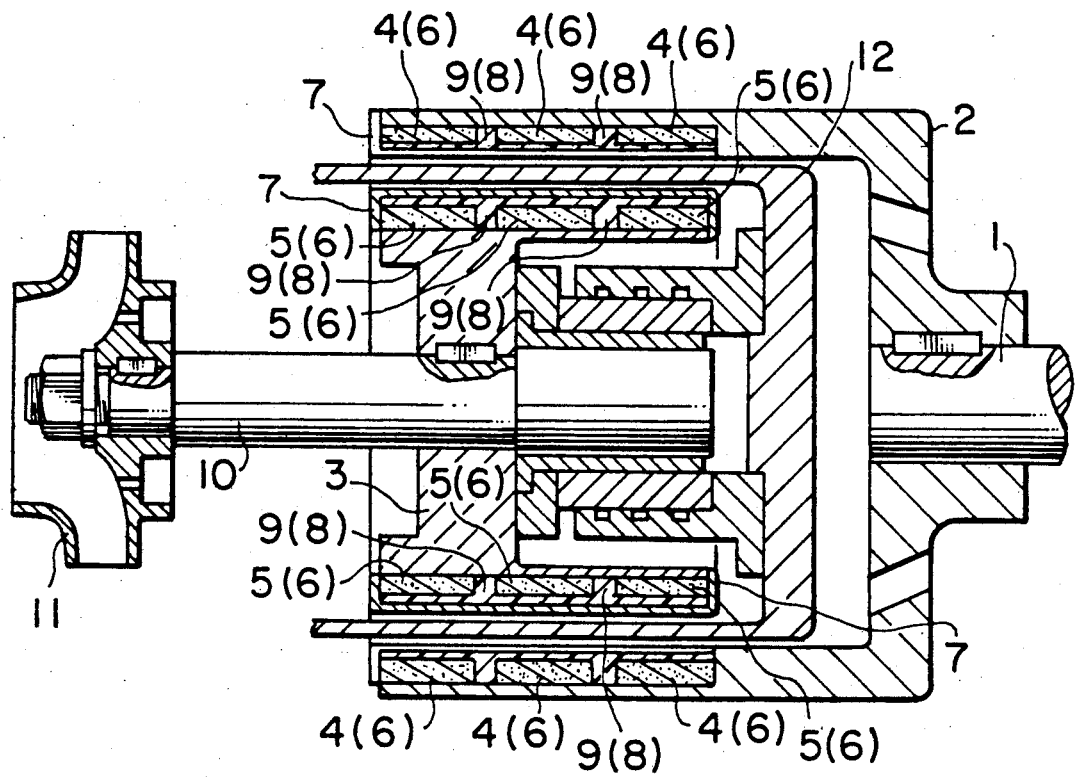
FIG. 1 is a fragmentary longitudinal sectional view of an embodiment of the magnet pump in accordance with the present invention.

Referring to FIG. 1, the magnet pump has a drive shaft 1, a magnet coupling composed of an outer ring 2 and an inner ring 3, an impeller 11 which is secured to the inner ring 3 through a driven shaft 10, a can 12 which isolates the driving part of the pump and the driven part of the same from each other, and a suction port and a discharge port (both are omitted from FIG. 1) provided in a pump casing. The drive shaft 1 is connected to a prime mover which is not shown.

The outer ring 2 of the coupling is connected to the drive shaft 1 and includes an outer ring yoke which is provided on the inner peripheral surface thereof with magnet pieces 4.

On the other hand, the inner ring 3 of the coupling is provided on the outer peripheral surface thereof with magnet pieces 5. The arrangement is such that the inner ring 3 rotates accompanying the rotating outer ring 2 as a result of magnetic attraction and repulsion of the magnet pieces 4 and 5.

The rotation of the inner ring 3 in turn causes the rotation of the driven shaft 10 which drives the impeller 11, so that a liquid is sucked through the suction port and discharged through the discharge port.

The inner ring 3 of the magnetic coupling has the following construction.

Figure 2:
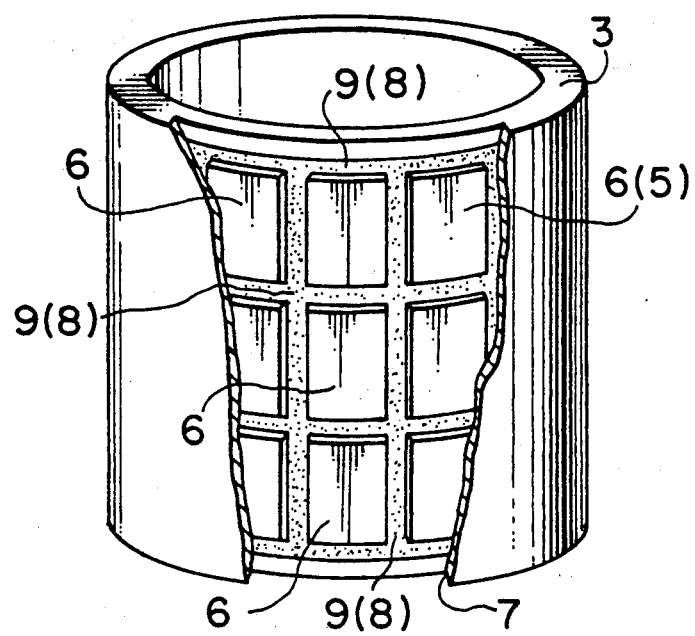
FIG. 2 is a fragmentary enlarged perspective view of an inner ring which, in cooperation with an outer ring, forms a magnet coupling of the magnet pump shown in FIG. 1.

Referring to FIG. 2, the inner ring has an inner ring yoke and a plurality of magnetized magnet pieces 6 bonded to the outer peripheral surface of the inner ring yoke at a predetermined circumferential interval.

The surface of the inner ring yoke carrying the magnetized magnet pieces 6 is covered by a non-magnetic cylindrical cover 7. A gap 8 is formed between the above-mentioned surface of the inner ring yoke and the non-magnetic cylindrical cover 7.

The gap 8 is filled with a self-curing resin 9 so that the inner ring yoke, the row of magnetized magnetic pieces 6 and the non-magnetic cylindrical cover 7 are integrated by means of the self-curing resin 9.

The outer ring 2 has a construction substantially the same as that of the inner ring 3, except that the magnet pieces are provided on the inner peripheral surface thereof and a non-magnetic cylindrical cover fits on the inner side.

A description will be given of the method of the present invention, in particular a method of constructing the magnetic coupling, which construction method being one of the characteristic features of the invention.

The inner ring 3 of the magnet coupling is produced as follows.

The plurality of magnetized magnet pieces 6 are bonded at a predetermined circumferential interval to the outer peripheral surface of the inner ring yoke. A plurality of resin filling ports, e.g., eight ports, are provided in an end surface of the inner ring yoke at a predetermined circumferential interval.

Then, a non-magnetic cylindrical cover 7, such as of hastelloy, is attached to the inner ring yoke by, for example, plasma welding, such that a gap 8 is formed between the surface of the inner ring yoke carrying the magnetized magnet pieces 6 and the cover 7. This non-magnetic cylindrical cover 7 also functions as a mold.

Then, a molten resin is charged into the gap 8 and is allowed to cure.

The charging of the molten resin at high pressure as in the conventional production process is not recommended because (i) such a high pressure would require a large thickness of the non-magnetic cylindrical cover which impairs the performance of the magnetic coupling and because (ii) some kinds of magnet material cannot withstand the temperature rise (150° to 200° C.) incurred during the curing of the resin.

Thus, a castable self-curing (two-liquid mixture curing) resin can suitably be used as the resin in the magnet coupling of the magnet pump of the present invention.

When the magnet pump of the invention is used as a coolant circulation pump for circulating coolant having γ-rays or neutron beams through the coolant circulation system, it is necessary that the magnet pieces used in the magnet coupling are neodymium-iron type magnets, in order to avoid demagnetization due to irradiation with radioactive rays and in order to insure the safety of the inspectors during a periodical inspection.

As will be seen from Table 1, the neodymium-iron type magnet is inferior in corrosion resistance and exhibits a large reversible temperature rise. In particular, the performance of this type of magnet is seriously deteriorated when the temperature is raised beyond 100° C. In order to maintain the performance of this type of magnet, therefore, it is preferred that the resin can cure at a comparatively low temperature.

The region around the magnet 5 composed of the row of the magnetized magnet pieces 6 is covered with the resin so that only small amount of oxygen remains in this region. However, in order to obtain a greater effect in preventing corrosion of the magnet, it is preferred that the charging with the molten resin curable at a low temperature is conducted after evacuating the gap inside the non-magnetic cylindrical cover or charging the gap with an inert gas such as Ar or He.

After the curing of the self-curing resin 9, the resin filling ports provided in the inner ring yoke are suitably closed.

A process for producing an inner ring has been described. It will be clear that the outer ring 2 also can be formed by a similar process.

After the formation of the outer and inner rings 2 and 3, these rings are assembled into a magnet coupling, whereby a magnet pump is completed as shown in FIG. 1.

In the described embodiment of the production method according to the invention, the non-magnetic cylindrical cover 7 serves as a mold, so that it is unnecessary to prepare and use a separate mold. This eliminates troublesome work of detaching the ring from a mold which is difficult due to strong magnetic attraction between the magnet and the metallic mold.

When the magnets 4, 5 are neodymium-iron type magnets, attention must be paid to the temperature rise which is caused during curing of the resin. Namely, this type of magnet in general cannot withstand high temperature above 80° C. Thus, the resin used in this case is a castable resin which exhibits small temperature rise during the setting. Examples of such resins are silicone rubber and epoxy resin.

Silicone rubber does not exhibit a temperature rise during curing. On the other hand, epoxy resin exhibits a temperature rise during curing.

Figure 3:
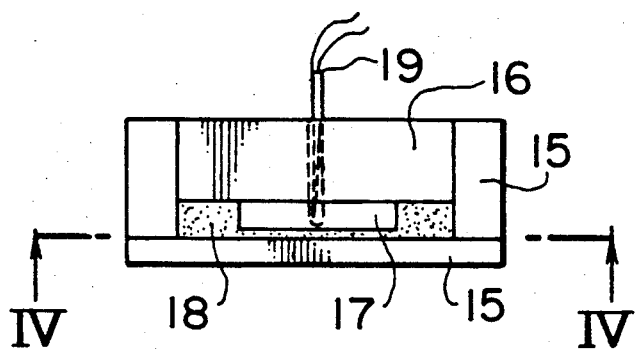
FIG. 3 is a front elevational view of a model used for measurement of temperature rise during curing of a resin which is curable at a low temperature.
Figure 4:
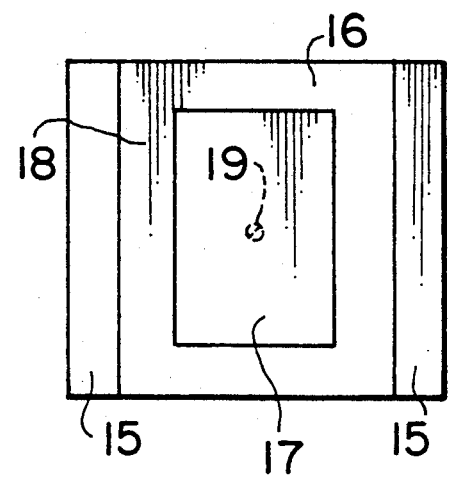
FIG. 4 is a bottom plan view of the model taken along the line IV—IV of FIG. 3.
Figure 6:
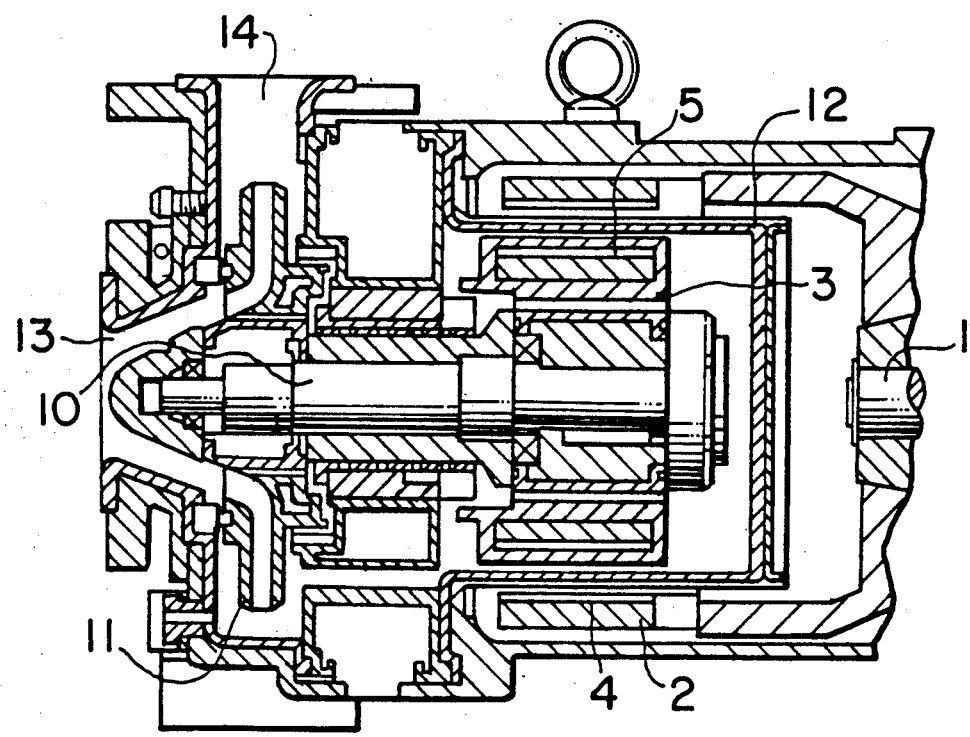
FIG. 6 is a longitudinal sectional view of the basic construction of a known magnet pump.

FIG. 3 is a front elevational view of a model used for measurement of temperature rise during curing of a resin which is curable at a low temperature, while FIG. 4 is a bottom plan view of the model taken along the line IV—IV of FIG. 3.

As will be seen from these Figures, the model was formed by setting a model yoke 16 and a model magnet 17 in a mold 15 and filling the space inside the mold with a resin 18 curable at a low temperature. Holes are formed through the model yoke 16 to reach the model magnet 17. Sensors of a thermo-couple 19 were inserted into these holes for the purpose of measurement of the temperature change during curing of the low-temperature curable resin 18.

Figure 5:
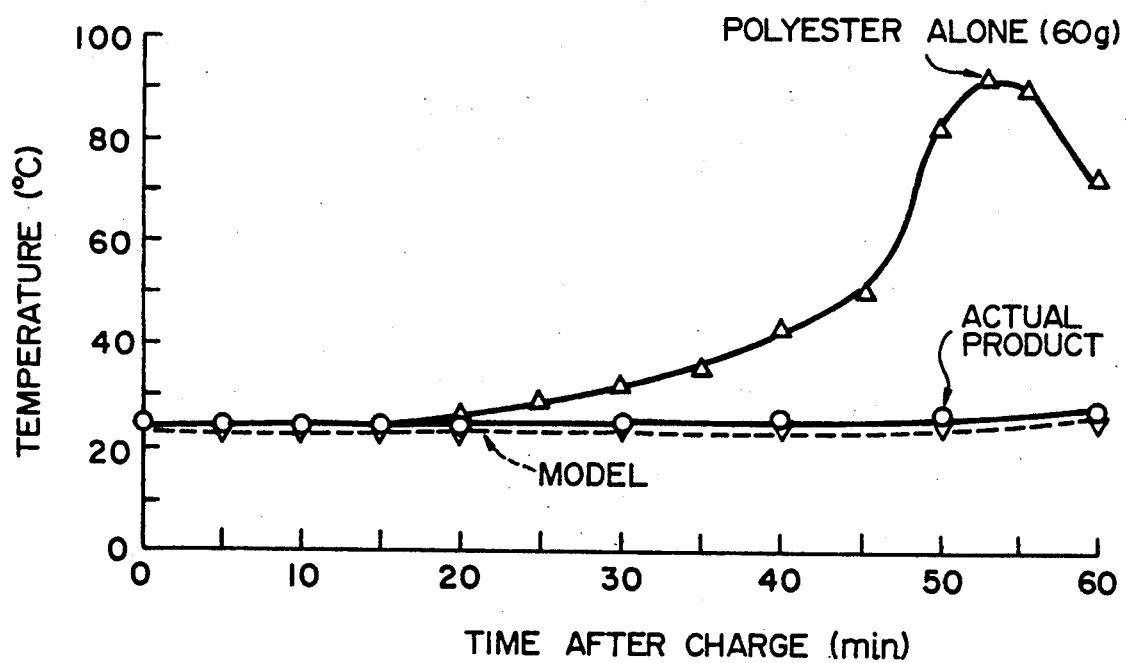
FIG. 5 is a graph showing the relationship between the time and the temperature of polyester resin as an example of the low-temperature curable resin during curing.

FIG. 5 is a graph showing the relationship between the time and the temperature of polyester resin as an example of the low-temperature curable resin during curing. The temperature rise was measured by allowing 60 g of the epoxy resin to cure in a cup made of a paper.

While the epoxy resin alone exhibits a temperature rise up to 91° C. during the curing, the model shown in FIG. 3 and 4 showed only slight temperature rise of 1° to 3° C. This is because the heat generated during the curing of the epoxy resin is radiated through the yoke made of iron.

This suggests that a resin which exhibits a temperature rise to 100° C. or lower when allowed to cure alone cannot cause a temperature rise to a level higher than 60° C. when allowed to cure in a magnet coupling ring and, hence, does not cause any unfavorable effect on the characteristics of the magnet.

The magnet pump of the present invention, having a magnet coupling described hereinbefore, can suitably be used in the coolant circulation system of a nuclear reactor equipment, offering advantages such as prevention of leakage of liquid having γ-rays and easy and safe periodical inspection.

The magnet pump of the invention, when the magnets of the magnetic coupling is of neodymium-iron type magnet, can suitably be used in the coolant circulation system for circulating coolant carrying neutron beams. In such a case, the pump offers an advantage that the degradation of the magnet due to irradiation with the neutron beams is avoided, in addition to the above-mentioned advantages.

A description will be given of a practical example of the invention.

Referring to FIG. 2, 32 pieces of magnetized magnet of neodymium-iron type, each being 34 mm wide, 25 mm long and 10 mm thick, were bonded to the outer peripheral surface of an inner ring yoke of 228 mm diameter and 150 mm long. Then, a non-magnetic cylindrical cover of hastelloy of 1 mm thick was bonded by plasma welding to the inner ring yoke. The inner ring yoke was beforehand provided with eight resin filling ports of 8 mm diameter in an end surface thereof. Then, polyester resin as a self-curing resin, composed of 100 parts of polyester resin and 2 parts of curing agent, was charged into the space inside the non-magnetic cylindrical cover through the resin filling ports, and was then allowed to cure. During the curing, the temperature change was measured by means of a thermo-couple with sensors inserted into holes of 1 mm diameter formed in the inner peripheral surface of the inner ring yoke. The temperature rise was as small as 1° to 2° C.

After the curing of the polyester, the resin filling ports were closed by welding, thus completing fabrication of the inner ring.

At the same time, an outer ring of 252 mm in outside diameter and 400 mm in length was fabricated substantially in the same manner as the inner ring, using 32 pieces of magnetized magnet each being 37 mm long, 24 mm wide and 10 mm thick.

These inner and outer rings are assembled together to form a magnet coupling, and the magnet pump of FIG. 1 was produced by using this magnet coupling.

This magnet pump was tested to show a flow rate of 2.5 m³/h and total head of 41 m, when driven by a motor of a rated output of 45 kW.

Although the invention has been described through specific terms, it is to be understood that the described embodiments are only for the illustrating purposes and various changes are possible within the scope of the invention.

For instance, the magnet pump of the invention may be constructed by fitting and fixing by for example, bonding resin sleeves in the gap between the outer peripheral surface of the inner ring yoke carrying the magnet pieces and the associated non-magnetic cylindrical cover and the gap between the inner peripheral surface of the outer ring yoke carrying the magnet pieces and the associated non-magnetic cylindrical cover, respectively.

What is claimed is:

1. A magnet pump having a magnet coupling for magnetically coupling an inner ring yoke and an outer ring yoke so as to magnetically transmit a torque from driving part to driven part of the pump to rotate the driven part, said magnet pump comprising: magnetized magnet pieces bonded to the outer peripheral surface of said inner ring yoke and magnetized magnet pieces bonded to the inner peripheral surface of said outer ring yoke; non-magnetic cylindrical covers respectively covering the surface of said inner ring yoke carrying said magnet pieces and the surface of said outer ring yoke carrying said magnet pieces; and molded resin parts filling the gap between said surface of said inner ring yoke and the associated non-magnetic cylindrical cover and the gap between said surface of said outer yoke ring and the associated non-magnetic cylindrical cover.

2. A magnet pump having a magnet coupling for magnetically coupling an inner ring yoke and an outer ring yoke so as to magnetically transmit a torque from driving part to driven part of the pump to rotate the driven part, said magnet pump comprising: magnetized magnet pieces attached to the outer peripheral surface of said inner ring yoke and magnetized magnet pieces attached to the inner peripheral surface of said outer ring yoke; non-magnetic cylindrical covers respectively covering the surface of said inner ring yoke carrying said magnet pieces and the surface of said outer ring yoke carrying said magnet pieces; and resin sleeves fitted and fixed in the gap between said surface of said inner ring yoke and the associated non-magnetic cylindrical cover and the gap between said surface of said outer yoke ring and the associated non-magnetic cylindrical cover.

3. A magnet pump according to one of claims 1 and 2, wherein at least the magnetized magnets on said inner ring yoke of said magnet coupling is made of a material composed of non-radioactive elements.

4. A magnet pump according to claim 3, wherein said magnetized magnet pieces are made of a material which contains, as major constituents, neodymium, iron and boron.

5. A magnetic pump according to claim 1, wherein said molded resin parts are fashioned of a self-curable resin having a temperature rise not greater than 90°.

6. A magnetic pump according to claim 2, wherein the resin sleeves are fashioned of a self-curable resin having a temperature rise not greater than 90°.

7. A nuclear reactor equipment wherein the magnetic pump according to one of claims 3 and 4 is a coolant circulation pump for circulating a coolant having γ-ray in a coolant circulation system of a nuclear reactor.

8. A nuclear reactor equipment wherein the magnetic pump according to one of claims 3 and 4 is a coolant circulation pump for circulation a coolant having neutron beams in a coolant circulation system of a nuclear reactor.

* * * * *